Figure 1:
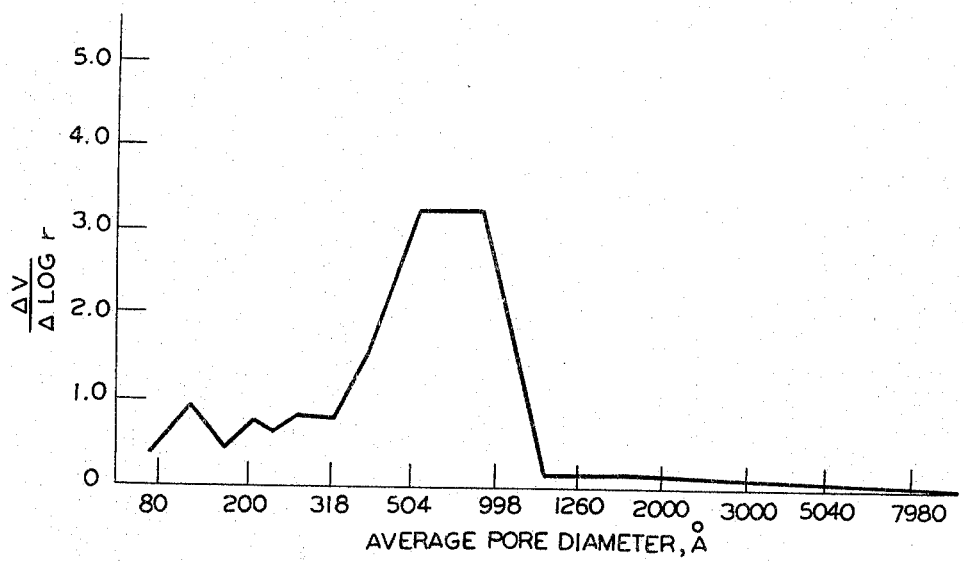
Figure 2:
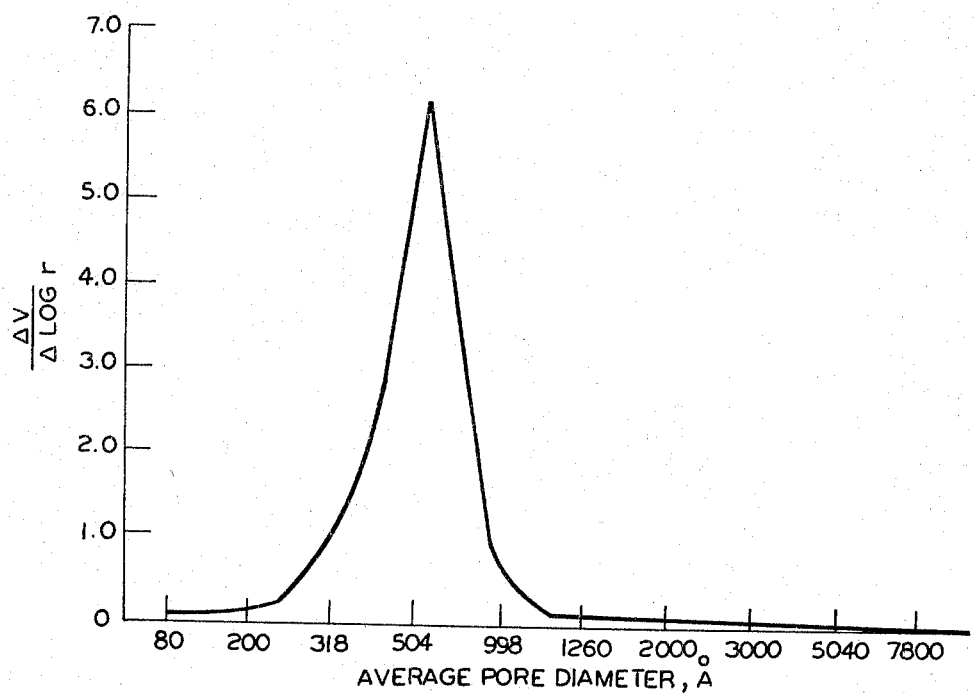

INVENTORS
J. S. MAGEE, JR.
W. S. BRIGGS
F. G. CIAPETTA

BY Joseph P. Nigon
ATTORNEY

3,325,247
PROCESS FOR PRODUCING HIGH POROSITY GAMMA ALUMINA
John S. Magee, Jr., Baltimore, and Warren S. Briggs and Frank G. Ciapetta, Silver Spring, Md., assignors to W. R. Grace & Co., New York, N.Y., a corporation of Connecticut
Filed Apr. 6, 1964, Ser. No. 357,649
1 Claim. (Cl. 23—143)

This invention relates to high purity gamma aluminas. More specifically, it relates to a novel process for the preparation of high purity gamma alumina having a narrow pore size distribution controllable from 500 to 1500 A.

Hydrous alumina or alumina gel is generally formed by adding ammonia or alkali to a suitable salt such as aluminum sulfate. The precipitate is very voluminous and gelationous. The gel often contains not over 10% alumina, the balance being water. In this form, it is the most reactive of the hydrous aluminas and combines with both acids and alkalis. The gel can be dried to a hard glass-like material and activated by heating. It has a high surface area which makes it useful as an adsorbent, as a catalyst or as a catalyst support.

The porosity characteristics of the alumina are dependent on their mode of preparation. Aluminas which have a pore diameter distribution in the range of from about 350 to 1500 Angstrom units and a large percentage of the pore diameters in the range of from about 500 to 600 Angstrom units are particularly desirable in the preparation of certain types of catalytic materials.

We have found that an alumina having a pore size distribution in the 500 to 1500 Angstrom unit diameter range can be prepared by precipitation of alumina from an aluminum nitrate solution using ammonium carbonate containing polyethylene glycol under very carefully controlled conditions.

Very briefly, our process comprises preparing an aluminum nitrate solution, preparing a mixed polyethylene glycol-ammonium carbonate solution, mixing the ammonium carbonate containing the glycol additives with the aluminum nitrate with vigorous stirring, aging, filtering, drying and finally calcining to recover the high purity gamma alumina product.

The essence of this invention thus resides in the method of preparing hydrated aluminas having porosities in the desired range.

The pore volume may be determined in one of two ways. "Nitrogen" pore volume is measured by the techniques described in the article by S. Brunauer, P. Emmett and E. Teller, J. Am. Chem. Soc. 60 309 (1938). This method depends on the condensation of nitrogen into the pores, and is effective for measuring pores with pore diameters in the range of about 10 to 600 Angstrom units.

"Mercury" pore volume is obtained by forcing mercury into the pores. The measurement of mercury pore volume was accomplished by using a standard mercury porosimeter. The operation of this system is dependent on the fact that mercury can be forced into different sized pores depending on the pressure exerted. Thus, at 100 p.s.i. absolute pressure, mercury can be forced into pores having a diameter above about 17,500 Angstroms. As the size of the pores decrease, the amount of pressure required to force mercury into the pores increases. This method is described in detail in the publication of Ritter, H. L., and Drake, L. C., Ind. Eng. Chem. Anal. Ed., 17, 787 (1945). The mercury pore volumes reported in the data in this application were measured at pressures from 0 to 15,000 p.s.i.

In the process of the instant application, the ratio of reactants and the reactant conditions are adjusted to provide a product with a mercury pore volume in the range of 1.4 to 2 cc./g. preferably 1.5 to 1.85 cc./g. The nitrogen pore volume should be in the range of about 0.36 to about 0.90 cc./g.

As a rule, the nitrogen pore volume must be above 0.50 to give the preferred mercury pore volume of 1.6 to 1.8 cc./g. Another important criterion of the product of the instant application is the location of the pore size distribution peak in the product. The products of the instant application have a distribution peak in the range of 1010 to 1460 A. diameter, preferably 1020 to 1460 A. diameter.

The first step in the preparation of the product of the instant application is the preparation of the salt solution. In the process of the instant application, the aluminum salt solution used is aluminum nitrate, substitution of aluminum sulfate for aluminum nitrate in the process of preparing our novel gamma type aluminas resulted in a product which did not have the desired pore volume and pore diameter distribution. This solution is prepared to contain 28 grams per liter of aluminum (as aluminum oxide). The carbonate to be used is then prepared. We can use either sodium carbonate or ammonium carbonate, ammonium carbonate being preferred, because it does not introduce sodium into the system. It is well known that a sodium is an undesirable component in some catalyst systems. The use of sodium carbonate in the process of the instant application would introduce sodium and necessitate a subsequent removal step. The ammonium carbonate is added to the aluminum nitrate solution in the mole ratio of ammonium carbonate to aluminum nitrate of from 1.6 to 1 to 2 to 1. It is critically important that these ratios be followed. Any change in the ratios result in a shift in the pore diameter distribution peak.

The ammonium carbonate is prepared to be 0.37 to 0.5 molar, preferably 0.5 molar.

The polyethylene glycol additives are added to the aluminum nitrate solution. It was found that the addition of these materials resulted in a sharp distribution peak in the desired range. The additives are present in an amount equal to 50 percent of the weight of the alumina theoretically formed.

The next step of our process comprises the steps of mixing the carbonate solution containing the additives with the aluminum nitrate solution. The two solutions are mixed at room temperature with vigorous stirring for about 15 minutes. After the stirring is completed, the mixture is then allowed to age for a period of 2 to 24 hours, preferably about 20 hours and then filtered, dried at 110° C. for a period of 24 hours, and finally calcined at about 650° C. The time of calcination varies with the condition, however, suitable results have been obtained when the product is calcined at about 650° C. for a period of 2 to 10 hours, preferably about 5 hours.

Since the primary use of the gamma type aluminas of our invention is as a catalyst support, the sodium content in the final product must be reduced to below about 0.45%. If sodium carbonate has been used in the neutralization, it is necessary to incorporate steps for the removal of the excess sodium. This washing should be carried out with deionized water which has a pH of about 4.5 to 7 preferably 4.7 to 6.0.

The gamma type aluminas of our invention are prepared using the polyethylene glycol additive. The polyethylene glycol additives used are water soluble polyethylene glycol polymers having the general structure $$(OCH_2—CH_2—OCH_2—CH_2—OH)$$

These materials are commercially available under the trade name of "Carbowax." We used Carbowax 400, 4,000 and 20,000. The material designated Carbowax 400 has an average molecular weight of about 400. The material designated Carbowax 4,000 has an average molecular weight of approximately 4,000 and the product designated 20,000 has molecular weight of about 20,000.

Example I

In this preparation, 50 g. of aluminum nitrate $$Al(NO_3)_3 \cdot 9H_2O$$

was dissolved in water to make 250 ml. of solution, 3.7 g. of glycol additive having an average molecular weight of 400 was added to a solution containing 25 g. of ammonium carbonate dissolved in 500 ml. of water. The ammonium carbonate solution was added to the aluminum nitrate solution and a mixture was stirred rapidly. The stirring was continued 15 minutes. The composite was allowed to age for a period of about 20 hours. At the end of this time, the slurry was filtered, the solids dried at about 110° C. and finally calcined at 650° C. for a period of 5 hours. The product had the following physical characteristics:

TABLE I.—PHYSICAL PROPERTIES

B.E.T. data:
    Surface area in m.$^2$/g. _____ 127
    Pore volume in cc./g. _____ 0.83
    Average pore diameter in A. ($N_2$) _____ 261

Mercury porosimeter data:
    Total "mercury" pore volume in cc./g. _____ 1.41
    Peak distribution from mercury porosimeter, diameter, A. _____ 500
    Total volatiles in percent _____ 8.05

Example II

The effect of the addition of polyethylene glycol in the process of the instant application was demonstrated in a run in which no glycol was added in the preparation. The run was carried out by mixing a solution containing 50 g. of aluminum nitrate ($Al(NO_3)_3 \cdot 9H_2O$) dissolved in water to make 250 ml. of a solution with a solution of 25 g. ammonium carbonate dissolved in 500 ml. of water. The process was carried on as in Example I. The ammonium nitrate solution was added to the carbonate solution with vigorous agitation. Stirring was continued for a period of 15 minutes. The slurry was aged overnight, filtered, dried at 110° C. and calcined at 650° C. for 5 hours. The physical characteristics in this product are set out in Table II.

TABLE II.—PHYSICAL PROPERTIES

B.E.T. data:
    Surface area in m.$^2$/g. _____ 139
    Pore volume in cc./g. _____ 0.52
    Average pore diameter A. ($N_2$) _____ 150

Mercury porosimeter data:
    Total "mercury" pore, volume in cc./g. _____ 1.52
    Peak distribution from mercury porosimeter, diameter, A. _____ 500
    Total volatiles in percent _____ 6.33

The advantage of adding the polyethylene glycol additive in the preparation of the aluminas of our invention demonstrated most vividly in the comparison of the graph of the mercury pore size distribution in the preparation using the glycol additives with the preparation in which no additive was used. It is apparent from a comparison of FIGURE I where the additive was used with FIGURE II that there is a marked increase in sharpness of the peak when the additive is used. This property would be quite valuable on certain catalyst applications where appropriate pore size with a very narrow size range distribution is desired.

Example III

The fact that the polyethylene glycol additives having a molecular weight of 4,000 and 20,000 respectively can be used in the preparation of the product of the instant application was shown in two runs in which the concentration of alumina and ammonium carbonate were the same as in Example I. In these runs, the additive with a molecular weight of 4,000 and the additive with a molecular weight of 20,000 were substituted for the additive molecular with a weight of 400.

In the first of these runs, a solution containing 50 g. of aluminum nitrate dissolved in water to make 250 ml. solution mixed with a solution containing 25 g. ammonium carbonate dissolved in 500 ml. of water and containing 3.7 g. of the polyethylene glycol additive having a molecular weight of 4,000. As in previous runs, the solutions were mixed together with vigorous stirring. The stirring was continued for 15 minutes and the resulting slurry was allowed to age overnight. After aging, the slurry was filtered, dried at 110° C. and finally calcined at 650° C. for a period of five hours.

In the second of these runs, the conditions were exactly the same as in the first run with the exception that 3.7 g. of the polyethylene glycol additive having a molecular weight of about 20,000 was added. A comparison of the total mercury pore volume, the pore distribution and the position of the maximum peak in A. of the three preparations in which the additive was used is set out in Table III.

TABLE III

| Average Molecular Weight of Additive | Total Mercury Pore Volume in cc./g. | Position of Maximum Peak |
|---|---|---|
| 400 | 1.41 | 510 |
| 4,000 | 1.59 | 510 |
| 20,000 | 1.42 | 510 |

It is apparent from a review of these data that any of the three polyethylene glycol additives give satisfactory results in preparing the product in instant application.

Example IV

The effect of variations in the concenrtations of the solutions and the position of the maximum peak in A. is shown in the series of runs in which the concentration of the ammonium carbonate and ammonium nitrate solutions were varied. These changes resulted in a shift of the maximum peak. Each of these preparations were made using the same techniques described previously. The only difference between these preparations and the preparations described in the previous examples is that the concentration of the aluminum nitrate and the ammonium carbonate were varied as shown. In each of these runs 3.7 g. of the polyethylene glycol polymer having an average molecular weight of 400 were added to the ammonium carbonate solution. The data collected in this series of runs are set out in Table IV below:

TABLE IV

| Aluminum Nitrate Solution | Ammonium Carbonate Solution | Position of Maximum Peak in A. Diameter |
|---|---|---|
| 50 g. in 250 ml | 25 g. in 500 ml | 729 |
| 50 g. in 80 ml | 25 g. in 60 ml | 1,458 |
| 250 g. in 3,000 ml | 1,250 g. in 3,000 ml | 2,625 |

It is obvious from the data that the change in the concentration of the aluminum nitrate and ammonium carbonate solution results in drastic changes in the position of the maximum peak. The position of maximum peak changed from 729 to 2625 A.

Obviously, many modifications and variations of the invention may be made without departing from the essence and scope thereof and only such limitations should be applied as are indicated in the appended claim.

What is claimed is:

A process for preparing high porosity gamma aluminas having a narrow pore size distribution in the 500 to 1500 A. diameter range which comprises the steps of:
(a) preparing an aluminum nitrate solution, containing about 28 grams per liter of aluminum calculated as aluminum oxide,
(b) precipitating alumina by the addition to said aluminum nitrate solution of a 0.37 to 0.5 molar ammonium carbonate solution containing 50 percent by weight based on the weight of alumina theoretically formed of a poyethylene glycol polymer having average molecular weights of about 400 to 4000, said ammonium carbonate being added in an amount to provide a mole ratio of ammonium carbonate to aluminum nitrate of from 1.6 to 1 to 2 to 1 and vigorously stirring the resulting mixture,
(c) aging the composite at a temperature of about 25° C. for about 20 hours,
(d) drying, calcining at about 650° C. and recovering the product.

References Cited

UNITED STATES PATENTS

| | | | |
|---|---|---|---|
| 2,256,505 | 9/1941 | Thompson | 23—143 X |
| 2,697,066 | 12/1954 | Sieg. | |
| 3,193,349 | 7/1965 | Mooi | 23—143 |

OSCAR R. VERTIZ, *Primary Examiner.*

H. CARTER, *Assistant Examiner.*